United States Patent [19]
Yazaki et al.

[11] Patent Number: 5,326,627
[45] Date of Patent: Jul. 5, 1994

[54] POLYOLEFIN-BASED WRAPPING FILM

[75] Inventors: Takao Yazaki; Masataka Noro; Takashi Matsui; Noriyuki Kobayashi; Hironari Sano; Koji Yamamoto, all of Mie, Japan

[73] Assignee: Mitsubishi Petrochemical Co., Ltd., Tokyo, Japan

[21] Appl. No.: 963,543

[22] Filed: Oct. 20, 1992

[30] Foreign Application Priority Data

Nov. 27, 1991 [JP] Japan ................... 3-312307
Jun. 25, 1992 [JP] Japan ................... 4-167646

[51] Int. Cl.$^5$ ..................... B32B 27/32; B29C 47/88
[52] U.S. Cl. ..................... 428/216; 428/331; 428/484; 428/349; 428/516; 428/520
[58] Field of Search ............... 428/331, 216, 484, 520, 428/516, 349

[56] References Cited

U.S. PATENT DOCUMENTS

| | | | |
|---|---|---|---|
| 4,367,256 | 1/1983 | Biel | 428/218 |
| 4,478,564 | 10/1984 | Shinmoto | |
| 4,542,188 | 9/1985 | van der Heijden | 525/240 |
| 4,551,380 | 11/1985 | Schoenberg | |
| 4,833,017 | 5/1989 | Benoit | 428/323 |

FOREIGN PATENT DOCUMENTS

| | | |
|---|---|---|
| 0066149 | 12/1982 | European Pat. Off. |
| 0092897 | 11/1983 | European Pat. Off. |
| 0286430 | 10/1988 | European Pat. Off. |
| 0348749 | 1/1990 | European Pat. Off. |
| 0351744 | 1/1990 | European Pat. Off. |
| 0436196 | 7/1991 | European Pat. Off. |
| 3502136 | 7/1985 | Fed. Rep. of Germany |

OTHER PUBLICATIONS

Patent Abstracts of Japan, vol. 9, No. 55, (M-362)(178), Mar. 9, 1985 & JP-A-59 190 831 Oct. 29, 1984.
Patent Abstracts of Japan, vol. 8, No. 230, (M-333)(1667), Oct. 23, 1984, JP-A-59 111 819 Jun. 28, 1984.
Patent Abstracts of Japan, vol. 10, No. 51, (M-457)(2108), Feb. 28, 1986, JP-A-60 201 926 Oct. 12, 1985.

Primary Examiner—P. C. Sluby
Attorney, Agent, or Firm—Oblon, Spivak, McClelland, Maier & Neustadt

[57] ABSTRACT

A polyolefin-based wrapping film having one or more layers which satisfies the following conditions (1) to (4):

(1) the film has a thickness ranging from 6 to 100 μm;
(2) the film has a birefringence $\Delta n_A$ of from $0.6 \times 10^{-3}$ to $8 \times 10^{-3}$;
(3) the film has a ratio of percent heat shrinkage in MD to percent heat shrinkage in TD of from 0.65 to 1.50 in a silicon oil bath at 140° C. for 3 minutes; and
(4) the film has a strain recovery of at least 18 mm, which provides excellent performance properties in stretch wrapping, especially in the area of high deformation recover.

30 Claims, 5 Drawing Sheets

POLYOLEFIN-BASED WRAPPING FILM

BACKGROUND OF THE INVENTION

1. Field of the Invention

This invention relates to a resin film for use in wrapping, such as stretch wrapping of foods or pallet stretch wrapping, or in bag formation and a process for producing the same.

2. Discussion of the Background

In the field of stretch wrapping or prepackaging of fresh foods, such as vegetables, fruits, fishes, and meats, and cooked foods, either with or without a plastic tray, films made of polyvinyl chloride-based resins are conventionally used. Recently, however, the use of ethylene-based resins, such as low-density polyethylene and ethylene-vinyl acetate copolymer, as a substitute for the polyvinyl chloride films has drawn much interest for safety and hygiene reasons.

However, films of known low-density polyethylene-based resins, such as low-density polyethylene or ethylene-1-butene copolymer, tend to be difficult to use as stretch wrapping because they are had and less stretchable. Forced stretching of these films results in non-uniform stretching or breaking of the film, or causes deformation or breakage of the food tray to which the film is applied causing the film to wrinkle. This fails to provide sufficient tension for achieving commercially valuable wrapping which must protect the food from loss of freshness and avoid contamination.

While a film of an ethylene-vinyl acetate copolymer, having appropriate properties, such as vinyl acetate content and melt flow rate, would solve above-described problems associated with low-density polyethylene films, these ethylene-vinyl acetate copolymer films, when used in stretch wrapping of sharp-edged foods or trays, tear easily at the sharp edge. Additionally, any small initial tear of the film which occurs during delivery of the wrapped articles tends to run or spread into a big tear, eventually leading to unwrapping.

Use of a laminate film composed of the above-mentioned low-density polyethylene film or a linear low-density polyethylene film and an ethylene-vinyl acetate copolymer film as disclosed in JP-B-2-12187 (the term "JP-B" as used herein means an "examined Japanese patent publication") would also solve the problems of hardness and non-stretchability, but still leads to a film which tears easily during wrapping or delivery. This is especially true when the film is of a reduced thickness, as is now preferred for reasons of conservation of raw materials and reduction of packaging costs.

In order to overcome the disadvantages associated with conventional stretch-wrapping films, a laminate film has been proposed. The laminate film, composed of an intermediate layer comprising a specific 1-butene polymer having laminated on both sides thereof a layer mainly comprising an ethylene-vinyl acetate copolymer having a vinyl acetate content of from 5 to 25% by weight, is obtained by blown-film extrusion at a blow-up ratio of from 3 to 7. This film seeks to provide a thin stretch-wrapping film which is excellent in stretchability, softness and particularly tear strength as well as moderate slip, self-adhesion, sufficient heat-sealability, and transparency, as disclosed in JP-A-61-89040 (the term "JP-A" as used herein means an "unexamined published Japanese patent application"), U.S. Pat. No. 4,713,282, and EP-B-198091.

Nevertheless, even the above-described stretch-wrapping film does not always satisfy market demands for wrapping, such as maintaining a tight fit to the shape of an article without wrinkling and recovering from deformation caused during delivery or display without wrinkling.

A wrapping film which exhibits excellent deformation recovery has been proposed as disclosed in JP-B-2-14898, U.S. Pat. No. 4,619,859 or EP-B-137454 and put to practical use.

That film is composed of at least four layers:

1) at least one base layer comprising a mixed composition selected from (A)+(B)+(C), (A)+(B), and (B)+(C); where
   (A) is at least one ethylene polymer selected from low-density polyethylene, a copolymer of ethylene with a monomer selected from a vinyl ester monomer, an aliphatic unsaturated monocarboxylic acid, and an alkyl ester of an aliphatic unsaturated monocarboxylic acid, and derivatives of the copolymer;
   (B) is a soft elastomer having a Vicat softening point of 60° C. or lower;
   (C) is at least one polymer selected from crystalline polypropylene and crystalline poly-1-butene;
2) an H layer comprising a polymer selected from (C); and
3) a surface layer (S layer) comprising at le one polymer selected from (A), (B), and crystalline 1,2-polybutadiene, such that at least one base layer is adjacent to the H layer.

The above-described multi-layer film is produced by co-extrusion of the layers through a layered annular die, followed by quenching of the extruded tubular film by a water cooling ring. The tubular film is then passed through two pairs of delivery nip rolls and draw nip rolls while heating to 37° C. with hot air. During this heating process, air is blown into the tube to inflate the tube continuously by means of a rectifying contact guide, thereby stretching the film about 3.3 to 3.6 times in the longitudinal direction and about 3.2 to 3.4 times in the transverse direction. The end region of stretching is cooled by directing cold air of 18° C. from an air ring onto the stretched tube, and the stretched film is folded flat with a deflator and drawn up with nip rolls. The stretched film is then subjected to heat setting with hot air of 40° C. for a few seconds. The heat-set film is cut into two sheets of film by slitting its edges in the longitudinal direction, and each film sheet is respectively wound up under constant tension to obtain the desired film having excellent shrinkability and strength.

Because the above-mentioned wrapping film is an oriented film obtained by cold stretching, when it is applied to a tray, such as a food tray, the tray tends to deform when the wrapping film is heat sealed.

Additionally, JP-B-2-12187 discloses a three-layered stretch-wrapping film composed of a linear low-density polyethylene layer having laminated on both sides thereof an ethylene-vinyl acetate copolymer film which is obtained by blown-film extrusion at a blow-up ratio of 3 to 6. However, the film still has deformation (strain) recovery which is inferior to polyvinyl chloride films.

SUMMARY OF THE INVENTION

Accordingly, one object of the present invention is to provide a wrapping film which has excellent stretchability, softness, tear strength and, in particular, deformation recovery.

A further object of the present invention is to provide a wrapping resin which has, in addition to the above mentioned properties, sufficient slip properties for use in automatic stretch wrapping machines, self-tack, and transparency.

A further object of the present invention is to provide a method for preparing the wrapping films discussed above.

Another object of the present invention is to provide an apparatus for performing the above method.

The above object of the present invention is accomplished by a polyolefin-based wrapping film having properties which satisfy the following conditions (1) to (4):

(1) the film has a thickness ranging from 6 to 100 μm;
(2) the film has a birefringence $\Delta n_A$ ranging from $0.6 \times 10^{-3}$ to $8 \times 10^{-3}$, the birefringence being defined by equation:

$$\Delta n_A = |n_{MD} - n_{TD}|$$

wherein $n_{MD}$ is a refractive index in the machine direction; and $n_{TD}$ is a refractive index in the transverse direction;

(b 3) when the film is allowed to stand in a silicone oil bath at 140° C. for 3 minutes, the ratio of percent heat shrinkage in the machine direction $S_{MD}$ to percent heat shrinkage in the transverse direction $S_{TD}$ ($S_{MD}/S_{TD}$; hereinafter referred to as heat shrinkage ratio) ranges from 0.65 to 1.50; and (4) the film has a strain recovery of at least 18 mm as measured by a test method comprising clamping a circular film specimen having a diameter of 100 mm, indenting the center of the specimen with a hemispherical indenter of 20 mm in diameter to cause deformation, and measuring the maximum strain (indentation) which disappears completely upon removal of the indenter.

Since the wrapping film of the present invention has a good stress balance between the machine direction (MD) and the transverse direction (TD), one can wrap an article therein without causing tearing of the film, deformation of a tray, or wrinkling of the film. The wrapping film of the present invention additionally has excellent deformation recovery.

DETAILED DESCRIPTION OF THE PREFERRED EMBODIMENTS

The present invention relates to a wrapping film comprising one or more layers of a polyolefin-based resin, wherein the layers may be the same or different, wherein the film has properties which satisfy the following conditions (1) to (4):

(1) the film has a thickness ranging from 6 to 100 μm;
(2) the film has a birefringence $\Delta n_A$ ranging from $0.6 \times 10^{-3}$ to $8 \times 10^{-3}$, the birefringence being defined by equation:

$$\Delta n_A = |n_{MD} - n_{TD}|$$

wherein $n_{MD}$ is a refractive index in the machine direction; and $n_{TD}$ is a refractive index in the transverse direction;

(3) when the film is allowed to stand in a silicone oil bath at 140° C. for 3 minutes, a ratio of heat shrinkage in the machine direction, $S_{MD}$, to heat shrinkage in the transverse direction, $S_{TD}$, ($S_{MD}/S_{TD}$) ranges from 0.65 to 1.50; and (4) the film has a strain recovery of at least 18 mm as measured by a test method comprising clamping a circular film specimen having a diameter of 100 mm, indenting the center of the specimen with a hemispherical indenter of 20 mm in diameter to cause deformation, and measuring the maximum strain (indentation) which disappears completely upon removal of the indenter.

The wrapping film of the present invention is preferably prepared from polyolefin-based resins. Suitable resins include ethylene-vinyl acetate copolymer having a content of ethylene-based structural units from 5 to 25% by weight and a melt flow rate (ASTM D-1238-86; 190° C., 2.16 kg; hereinafter abbreviated as MFR) of from 0.3 to 5 g/10 min, linear low-density polyethylene comprising from 80 to 99% by weight of ethylene-based structural units and from 1 to 20% by weight of structural units based on an α-olefin having from 3 to 8 carbon atoms, high-density polyethylene, low-density polyethylene, ethylene-acrylic acid copolymer, ethylene-methyl acrylate copolymer, ethylene-methyl methacrylate copolymer, polypropylene, a copolymer comprising 88 to 99.5% by weight of propylene-based structural units and from 0.5 to 12% by weight of ethylene-based structural units or structural units based on an α-olefin having from 4 to 8 carbon atoms, poly(4-methyl-1-pentene), and polybutene. Examples of the above-mentioned α-olefin include 1-butene, 1-heptene, 1-hexene, 4-methyl-1-pentene, and 1-octene.

These polyolefin-based resins may be used either individually or in combinations of two or more.

If desired, the polyolefin-based resin can contain an impact modifier in an amount which does not impair the transparency of the film, preferably 0.5 to 20% by weight, more preferably 1 to 10% by weight. Suitable impact modifiers include hydrogenated petroleum resin, hydrogenated styrene-butadiene-styrene copolymer, ethylene-propylene copolymer rubber, 1,2-polybutadiene and ethylene-propylene-ethylidenenorbornene copolymer rubber.

The polyolefin-based resin may further contain a lubricant for improving slip properties, a tackifier, a nucleating agent for improving transparency or any combination of these agents in a total amount of (lubricant +tackifier+nucleating agent) of from 0.05 to 5% by weight, preferably from 0.1 to 3% by weight.

Suitable lubricants include fatty acid amides, such as oleamide, stearamide, and erucamide; fatty acid glycerin esters, such as glycerol monostearate, glycerol distearate, glycerol mono-oleate, and glycerol dioleate; and polyethylene glycol adducts of these glycerides. Suitable nucleating agents include inorganic substances, such as talc and silica. Suitable tackifiers include castor oil derivatives, low-molecular weight viscous polybutylene, and sorbitan higher fatty acid esters having from 12 to 22 carbon atoms in the fatty acid group, preferably from 15 to 22 carbon atoms.

The wrapping film of the present invention has a single layer structure or a laminate structure. A multilayer laminate structure is preferred from the standpoint of moldability and balance of physical properties of the film. The layer structure of the multi-layer film includes the following embodiments (1) to (8):

(1) A laminate film composed of an intermediate layer comprising a linear low-density polyethylene-based resin having an MFR (ASTM D1238-86; 190° C., 2.16 kg) of from 0.1 to 5 g/10 min and a Q-value (ratio of weight average molecular weight to number average molecular weight) of from 1 to 6 having laminated on both sides thereof a surface layer comprising a copolymer resin comprising from 60 to 95% by weight of ethylene-based structural units and from 5 to 40% by weight of structural units derived from a monomer selected from vinyl acetate, an aliphatic unsaturated carboxylic acid, and an aliphatic unsaturated carboxylic acid alkyl ester.

(2) A laminate film composed of an intermediate layer comprising from 10 to 90% by weight of a crystalline polyolefin-based resin selected from an ethylene-based resin and a propylene-based resin and from 10 to 90% by weight of an olefinic thermoplastic elastomer having laminated on both sides thereof a surface layer comprising a copolymer resin comprising from 60 to 95% by weight of ethylene-based structural units and from 5 to 40% by weight of structural units derived from a monomer selected from vinyl acetate, an aliphatic unsaturated carboxylic acid, and an aliphatic unsaturated carboxylic acid alkyl ester.

(3) A laminate film composed of an intermediate layer comprising from 80 to 95% by weight of linear low-density density polyethylene-based resin and from 5 to 20% by weight of a copolymer resin comprising from 60 to 95% by weight of ethylene-based structural units and from 5 to 40% by weight of structural units derived from a monomer selected from vinyl acetate, an aliphatic unsaturated carboxylic acid, and an aliphatic unsaturated carboxylic acid alkyl ester, having laminated on both sides thereof a surface layer comprising a copolymer resin comprising from 60 to 95% by weight of ethylene-based structural units and from 5 to 40% by weight of structural units derived from a monomer selected from vinyl acetate, an aliphatic unsaturated carboxylic acid, and an aliphatic unsaturated carboxylic acid alkyl ester.

(4) A laminate film composed of an intermediate layer comprising from 10 to 90% by weight of a 1-butene-based resin and from 10 to 90% by weight of (a) a polyolefin-based resin (exclusive of a 1-butene-based resin), (b) an olefinic thermoplastic elastomer or both (a) and (b), having laminated on both sides thereof a surface layer comprising a copolymer resin comprising from 60 to 95% by weight of ethylene-based structural units and from 5 to 40% by weight of structural units derived from a monomer selected from vinyl acetate, an aliphatic unsaturated carboxylic acid, and an aliphatic unsaturated carboxylic acid alkyl ester.

(5) A laminate film composed of a low-density polyethylene resin layer having laminated on one or both sides thereof a linear low-density polyethylene resin layer.

(6) A laminate film composed of a high-density polyethylene resin layer having laminated on one or both sides thereof a low-density polyethylene or linear low-density polyethylene resin layer.

(7) A laminate film composed of a linear low-density polyethylene-based resin layer having laminated on one or both sides thereof a low-density polyethylene or propylene-based resin layer.

(8) A laminate film composed of a propylene-based resin layer having laminated on one or both sides thereof a linear low-density polyethylene-based resin layer.

Of the above-mentioned layer structures, (1) and (3) are particularly preferred from the viewpoint of strain recovery.

Suitable linear low-density polyethylene-based resins used in (1), (3), and (5) to (8) include ethylene-based copolymers having an MFR of from 0.1 to 5 g/10 min, a Q-value of from 1 to 6, and a density of from 0.89 to 0.92 g/cm$^3$ e.g., ethylene-1-butene copolymers, ethylene-1-hexene copolymers, ethylene-1-butene-1-hexene copolymers, ethylene-4-methyl-1-pentene copolymers, ethylene-1-hexene copolymers, ethylene-1-octene copolymers, and mixtures thereof.

The crystalline polyolefin-based resin to be used the intermediate layer of (2) is a stereoregular polyolefin-based resin or mixture of stereoregular polyolefin-based resins. Examples of these include crystalline ethylene-based resins and crystalline propylene-based resins.

The crystalline ethylene-based resins, noted, above, include ethylene homopolymer and copolymers comprising at least 65% by weight, preferably 75 to 95% by weight, of ethylene-based structural units and structural units derived from at least one $C_3$–$C_{10}$ α-olefin, such as propylene, 1-butene, 1-hexene, 4-methyl-1-pentene, and 1-octene. The crystalline ethylene-based resins have a crystallinity of from 20 to 80%, preferably 40 to 80% and an MFR (ASTM D1238-86) of from 0.1 to 10 g/10 min, preferably 0.1 to 5 g/10 min. Preferred crystalline ethylene-based resins include low-density polyethylene and linear low-density polyethylene, each having a density of from 0.89 to 0.93 g/cm$^3$.

The crystalline propylene-based resins noted above, include propylene homopolymer and random or block copolymers comprising at least 60% by weight, preferably 70 to 95% by weight, of propylene-based structural units and structural units derived from a $C_2$–$C_{10}$ α-olefin (except $C_3$), such as ethylene, 1-butene, 1-octene, 1-hexene and 4-methyl-1-pentene. The crystalline propylene-based resins have a crystallinity of from 20 to 80%, preferably from 40 to 80%, an isotactic index of from 40 to 99%, preferably from 55 to 90%, and an MFR (230° C., 2.16 kg) of from 0.1 to 10 g/10 min, preferably from 0.3 to 10 g/10 min.

Suitable 1-butene-based resins for use in (40 include 1-butene homopolymer and random or block copolymers comprising at least 60% by weight, preferably 70 to 95% by weight of 1-butene-based structural units and structural units derived from a $C_2$–$C_{10}$ α-olefin (other than 1-butene), such as ethylene, propylene, 1-octene, 1-hexene and 4-methyl-1-pentene.

Suitable propylene-based resins used in (7) and (8) include a homopolymer of propylene, a copolymer of propylene and ethylene, a copolymer of propylene and 1-butene, and a copolymer of propylene and 4-methyl-1-pentene.

The olefinic thermoplastic elastomer to be mixed with the crystalline polyolefin-based resin in (2) includes copolymers comprising from 65 to 90%, preferably 75 to 90%, by weight of ethylene-based structural units and from 10 to 35%, preferably 10 to 25%, by weight of propylene-based structural units, 1-butene-based structural units or a mixture thereof. The elastomers have a density of from 0.86 to 0.89 g/cm$^3$. The olefinic thermoplastic elastomer serves to improve stretchability and elasticity of the wrapping film.

If desired, the intermediate layer of (1) to (8) may contain from 3 to 25%, preferably 5 to 15%, by weight of the same ethylene-based copolymer resin as used in the surface layer. This can be accomplished by returning the flash during the molding process so that it becomes incorporated into the intermediate layer.

The copolymer resin used in the surface layer of (1) to (4) is a copolymer comprising from 60 to 95%, preferably 70 to 95%, by weight of ethylene-based structural units and from 5 to 40%, preferably 7 to 30%, by weight of structural units derived from a monomer selected from vinyl acetate, an aliphatic unsaturated carboxylic acid, and an aliphatic unsaturated carboxylic acid alkyl ester. Examples of such an ethylene-based copolymer include ethylene-vinyl acetate copolymers, ethylene-acrylic acid copolymers, ethylene-methacrylic acid copolymers, ethylene-ethyl acrylate copolymers, and ethylene-methyl methacrylate copolymers. Ethylene-vinyl acetate copolymers having a vinyl acetate-derived content of from 5 to 25% by weight and an MRF of from 0.3 to 5 g/10 min are preferred.

The copolymer resin used in the intermediate layer of (3) is a copolymer comprising from 60 to 95% by weight of ethylene-based structural units and from 5 to 40% by weight of structural units derived from a monomer selected from vinyl acetate, an aliphatic unsaturated carboxylic acid, and an aliphatic unsaturated carboxylic acid alkyl ester. Examples of such an ethylene-based copolymer include ethylene-vinyl acetate copolymers, ethylene-acrylic acid copolymers, ethylene-ethyl methacrylate copolymers, and ethylene-methyl methacrylate copolymers.

For the purpose of endowing the film with moderate slip properties, self-tack, anti-fogging properties, and antistatic properties, the intermediate layer, surface layer or both, of the above-mentioned laminate structures may contain from 0.5 to 5% by weight, and preferably from 1 to 3% by weight, of at least one compound selected from aliphatic alcohol a fatty acid esters and polyalkylene ether polyols. The aliphatic alcohol fatty acid esters include those obtained from an aliphatic alcohol having from 1 to 12 carbon atoms, and preferably from 1 to 6 carbon atoms, and a fatty acid having from 12 to 22 carbon atoms, and preferably from 12 to 18 carbon atoms, such as glycerol mono-oleate, glycerol polyoleate, glycerol triricinoleate, glycerol acetylricinoleate, methyl acetylricinoleate, ethyl acetylricinoleate, butyl acetylricinoleate, ptopylene glycol oleate, propylene glycol laurate, pentaerythritol oleate, polyoxyethylene glyceride, polyoxypropylene glyceride, sorbitan oleate, sorbitan laurate, polyethylene glycol sorbitan oleate, and polyethylene glycol sorbitan laurate. The polyalkylene ether polyols include polyethylene glycol and polypropylene glycol.

Figure 4:
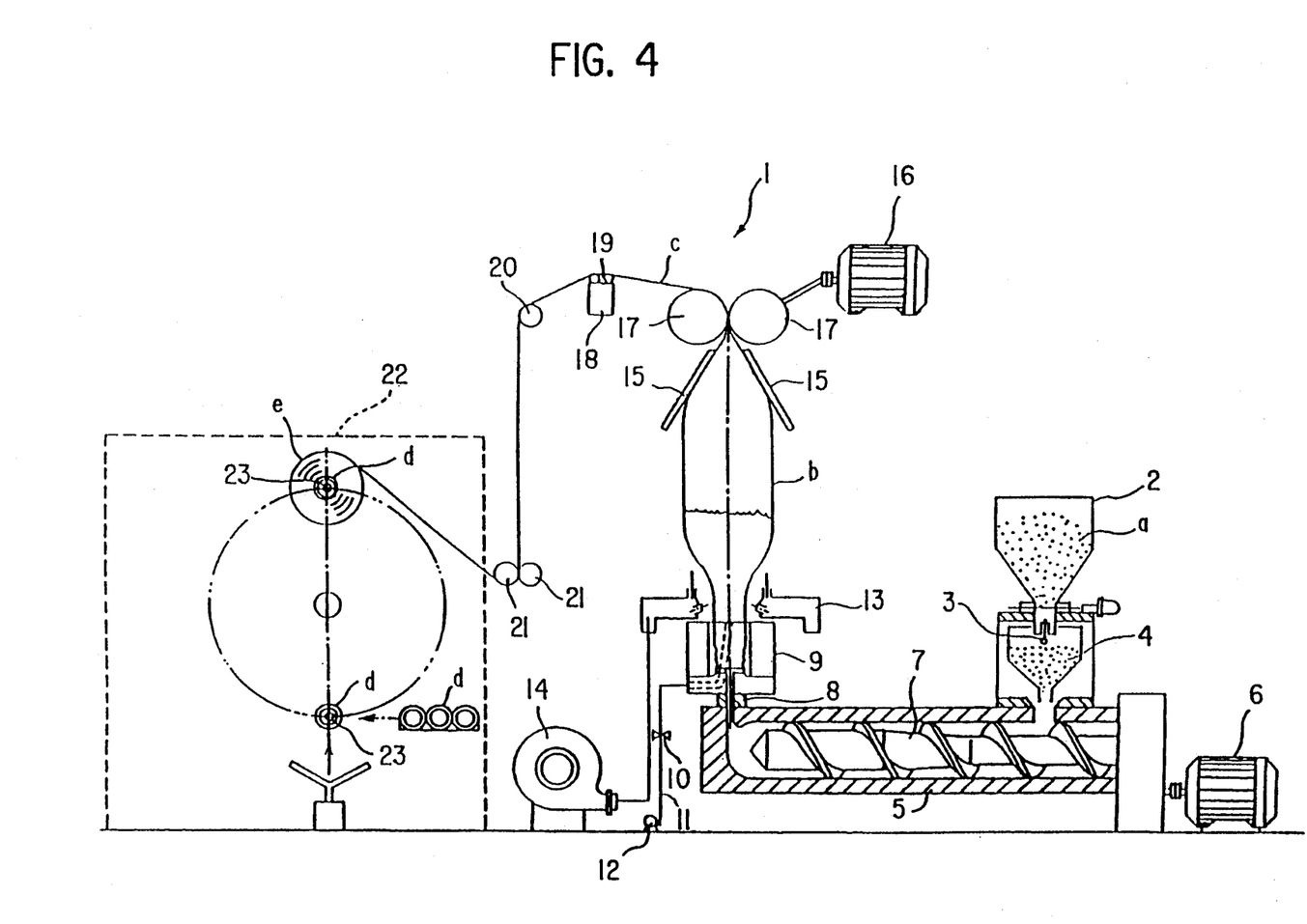
FIG. 4 is a plan view of a blown-film extrusion machine used in the production of the wrapping film according to the present invention.

The wrapping film of the present invention can be produced by any suitable film production method, such as blow-film extrusion using blown-film extrusion machine 1 shown in FIG. 4.

In blow-film extrusion machine 1, starting thermoplastic resin a is stored in storage hopper 2. Under instructions from a computer, load cell 3 works in accordance with the blow film take-off speed to feed thermoplastic resin a automatically to feed hopper 4. Thermoplastic resin a is fed from feed hopper 4 to extruder 5 having screw 7 driven by screw motor 6, where it is melt-kneaded and extruded upward from the head of the extruder. Blowing head containing ring die 9 is provided at the head of extruder 5 in the vertical direction via direct coupling 8. To blowing head 9 is connected inflator (air pump) 12 via pipe 11 having electromagnetic valve 10 so that air is blown into the inside of the extruded resin tube to form tubular bubble b at a blow-up ratio of from 8 to 20.

Tubular bubble b is then cooled with air fed from cooling blower 14 through air cooling equipment 13 having an air cooling ring set above blowing head.

Tubular bubble b is guided by a pair of guide plates 15 and passed through a pair of nip rolls 17 driven by take-off motor 16 to obtain flattened tube c.

Flattened tube c is introduced into width measuring means 18 in which the flattened width is measured by width sensor 19 and then, while being guided by guide rolls 20, 21, 21, wound up around paper reel d held by reel holder 23 in wind-up 22. In FIG. 4, e is a film wind-up roll.

When the blown film is to be used as a bag-forming film, flattened tube c is wound up around paper reel d as a flat tube. When the blown film is to be used as a wrapping film or a stretch film, the width of flattened tube c is slit into a desired number of sheets and wound up around the respective paper reel d.

The terminology "blow-up ratio" as used in blown-film extrusion means a ratio of the final inner diameter of a blown tube to an outer diameter of the ring die. Olefin resins are generally inflated at a blow-up ratio of from 1.2 to 7. Blown films having a blow-up ratio of from 3 from 7 are called high blown films in the art.

In order to obtain stretch-wrapping films having satisfactory strain recovery according to the present invention by blown-film extrusion, the blow-up ratio ranges from 8 to 20 (from 9 to 20 for the production of the above-described laminated films (1) and (3), and preferably from 10 to 16. Such a high blow-up ratio can be reached by using a specific cooling apparatus as shown in FIG. 1 or FIG. 3 as the air cooling equipment 13 in FIG. 4.

Figure 1:
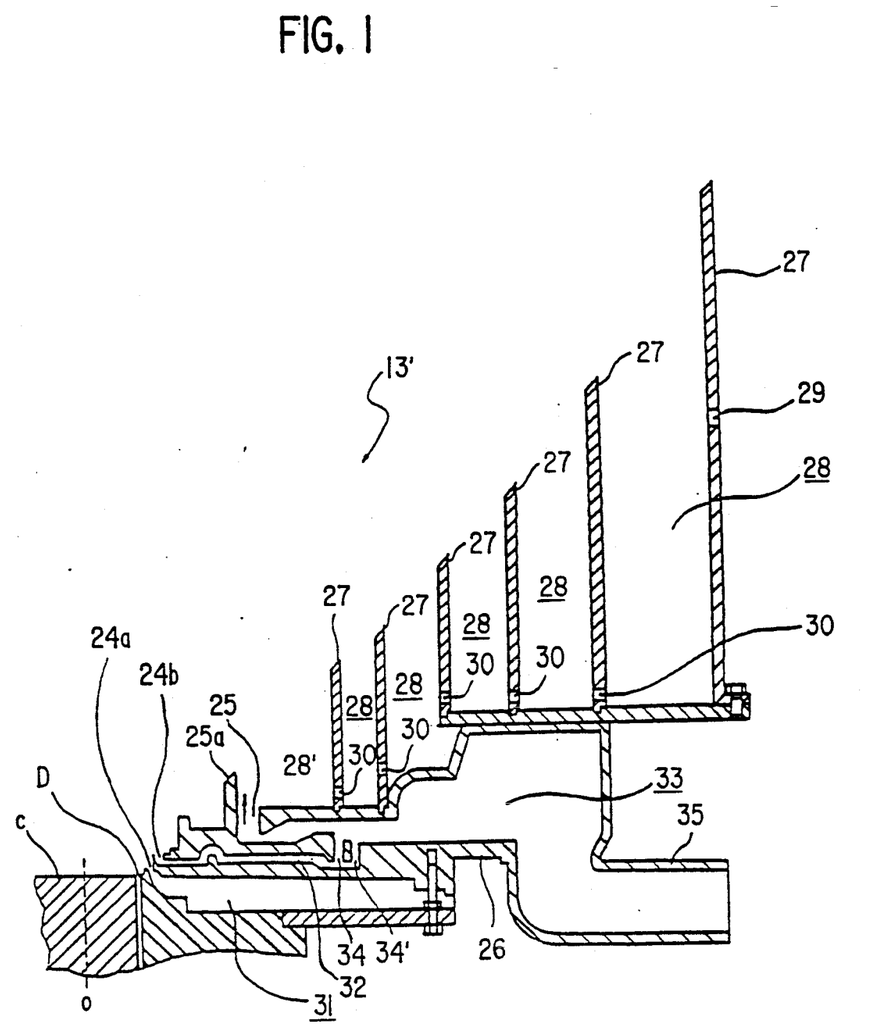
FIG. 1 is a cross-sectional view of a cooling apparatus used in blown-film extrusion for the production of the wrapping film according to the present invention.
Figure 3:
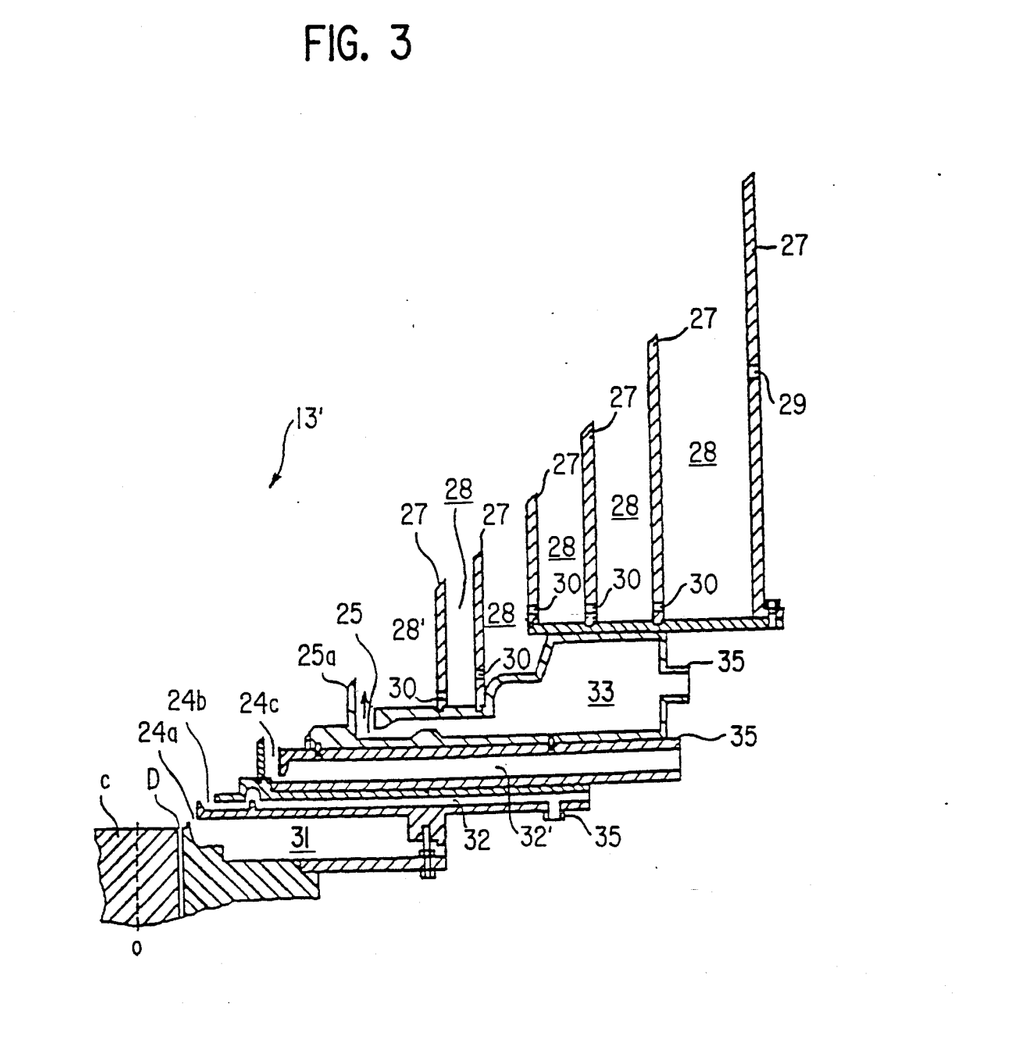
FIG. 3 is a cross-sectional view of another cooling apparatus used in blown-film extrusion for the production of the wrapping film according to the present invention.

Air cooling equipment 13' shown in FIG. 1 or FIG. 3 comprises air ring 26, a plurality of rectifying cylinders 27 and a rectifying cylinder 25a. Air ring 26, which is provided around orifice D of ring die C, has at least three air nozzles 24a (upstream nozzle), 24b (midstream nozzle), and 25 (downstream nozzle) preferably circular air nozzles. Upstream nozzle 24a and midstream nozzle 25b serve as auxiliary air nozzles, while downstream rate of these air nozzles increasing in the order $24a < 24b < 25$. A plurality of rectifying cylinders 27 having different diameters are arrayed at certain intervals in the radial direction concentrically with the air nozzles. Between each two adjacent cylinders, there is formed ring air chamber 28, 28' with its downstream end open.

Figure 2:
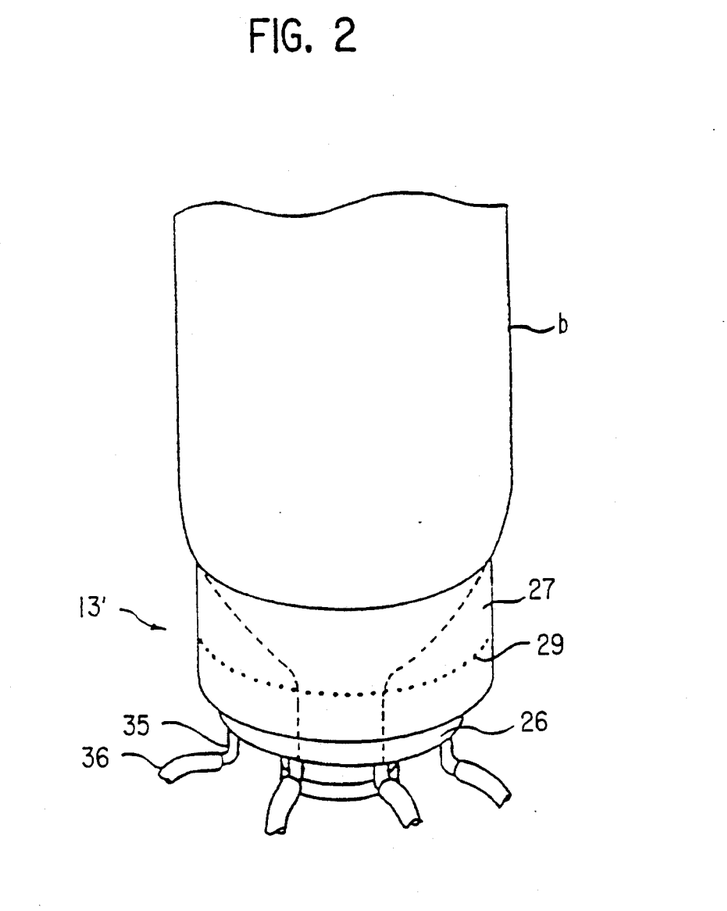
FIG. 2 is a side view of the cooling apparatus FIG. 1.

The outermost rectifying cylinder has a plurality of intake vents 29 for intake of open air at the positions on the same plane perpendicular to the axis thereof, and closer to air ring 26 than to the downstream end as shown in FIG. 2. All the rest of the rectifying cylinders each have vent 30 at the bottom end (upstream end) thereof so that air chambers 28 are ventilated. The height of rectifying cylinders 27 gradually increases toward the outermost one so that the downstream ends of these cylinders may form a tapered guide for the bubble, making an angle of from 45 to 70° with axis O of orifice D.

When the above-mentioned cooling apparatus is employed for the production of a blown film, as blow-up ratio increases with the film thickness and the take-off speed being fixed, the bubble can be supported in a stable manner irrespective of the blow-up ratio by increasing the number of the auxiliary air nozzles and, if desired, also increasing the number of the air chambers supporting the bubble.

The air amount from midstream nozzle 24b and from upstream nozzle 24a ranges from 5 to 20 parts by volume and from 0.1 to 3 parts by volume, respectively, with that from downstream nozzle 25 being taken as 100 parts by volume.

In air ring 26, the air in first chamber 31 leading to upstream nozzle 24a is usually the atmosphere. If necessary, air may be supplied to first chamber 31 by means of a blower.

air supply to second chamber 32 leading to midstream nozzle 24b and third chamber 33 leading to downstream nozzle 25 is effected by means of blower 14. In FIG. 1, second chamber 32 and third chamber 33 are connected via passageways 34 and 34'. blower 14 is connected to air ring 26 via size pipes 35 provided on the side wall of air ring 26 and their respective hoes 36.

In cooling apparatus 13' shown in FIG. 3, air ring 26 has three auxiliary air nozzles 24a, 24b, and 24c. 32' is another second chamber of air supplying.

The chambers leading to the respective air nozzle may be independent of each other as in FIG. 3. In that case, each chamber connects with the respective blower.

The speed of air flow from each air nozzle varies depending on the blow-up ratio, the diameter of the bubble, or the take-off speed, and range from 0.1 to 10 m/sec at upstream nozzle 24a, from 5 to 40 m/sec at midstream nozzle 24b or 24c (increasing upstream), and from 10 to 50 m/sec at downstream nozzle 25.

Since the extruded tube in the molten state is preliminarily cooled with air from auxiliary air nozzles 24a, 24b, and 24c, the amount of blowing air from the main nozzle can be reduced compared to conventional processes. That is, the speed of air flow from the main nozzle does not need to be higher than 50 m/sec. The air from the main nozzle blowing against the bubble and thereby having its temperature slightly raised is then made to flow downstream between the bubble and the tapered conical section formed by the downstream ends of the rectifying cylinders. By the action of the thus produced Venturi effect, the inner pressure of each ring air chamber 28 is diminished thereby letting open air in through intake vents 29 and vents 30. Part of the air in the air chambers joins the air flow from the air nozzles and is made to flow downstream along, the bubble to rapidly cool the bubble. At the same time, the bubble can be stably supported from the outer peripheral side by the ring air chambers having diminished inner pressure.

Since the height of the rectifying cylinders increases downstream to form a tapered conical section widening downstream, the extruded bubble can be rapidly inflated even to a high blow-up ratio without contacting with the downstream end of the rectifying cylinder immediately after extrusion.

Further, open air taken in through intake vents 29 is made to flow through each air chamber via the respective vent 30 in proportion to the degree of pressure decrease. Therefore, the pressure in each air chamber is constantly maintained at a pressure suited for bubble inflation.

The wrapping film of the present invention satisfies the following conditions (1) to (4):

(1) the film has a thickness ranging from 6 to 100 μm;
(2) the film has a birefringence $\Delta n_A$ ranging from $0.6 \times 10^{-3}$ to $8 \times 10^{-3}$, the birefringence being defined by equation:

$$\Delta n_Z = |n_{MD} - n_{TD}|$$

wherein $n_{MD}$ is a refractive index in the machine direction; and $n_{TD}$ is a refractive index in the transverse direction;

(3) upon standing in a silicone oil bath at 140° C. for 3 minutes, the film has a ratio of percent heat shrinkage in the machine direction $S_{MD}$ to percent heat shrinkage in the transverse direction $S_{TD}$ (heat shrinkage ratio, $S_{MD}/S_{TD}$) of from 0.65 to 1.50; and (4) the film has a strain recovery of at least 18 mm as measured by a test method comprising clamping a circular film specimen having a diameter of 100 mm, indenting the center of the specimen with a hemispherical indenter of 20 mm in diameter to cause deformation, and measuring the maximum strain (indentation) which will disappear completely on removal of the indenter.

When the wrapping film of the present invention is to be used in stretch wrapping or pillow type packaging, it preferably satisfies the following additional conditions (5) and (6):

(5) the film has a haze (JIS Z-6714) of not more than 3%.
(6) the film has a tensile modulus (ISO R-1184) of from 600 to 1400 kg/cm² in both the machine and transverse directions.

With respect to condition (1), for use as a stretch-wrapping film for foods or a bag-forming film, the preferred thickness is from 8 to 30 μm, from the standpoint of economy and transparency. In the case of the multi-layer laminate structures, the intermediate layer has a preferred thickness of from 2 to 10 μm and each surface layer has a preferred thickness of from 3 to 10 μm. For use as a pallet stretch wrapping film, a preferred film thickness is from 20 to 50 μm.

With respect to condition (2), the birefringence $\Delta n_A$ of the film is measured with a polarizing microscope "OPTIPHOT-POL" manufactured by Nicon Co., Ltd. according to the following instructions.

(1) One drop of "Oil Type B" produced by Nicon Co., Ltd. is placed on a slide glass, followed by a 5 mm-square film specimen on the oil droplet. One more drop of the same oil is then placed on the film specimen. A cover glass is placed thereon to prepare the sample for measurement. (2) The sample is fixed on the stage. (3) A compensator having three through-holes is inserted into the slot and fixed in such a position that the middle hole of the compensator is on the axis of the film specimen. (4) Polarized light is obtained using the button by the side of the upper dial plate. Then, the zero of the upper dial plate is adjusted to the zero of the lower dial plate. (5) The stage is then turned until the field of view gets dark, and the scale value on the stage read. (6) The compensator is then replaced by a quartz wedge. (7) The stage is turned to either $+45°$ or $-45°$ from the scale value read in (5). Then, the quartz wedge is slowly moved forward and backward. When the view begins to turn from white to yellow, the scale value on the quartz wedge is read, and the scale value ($\psi$) on the quartz wedge when the field is whiter than at $\pm 45°$ is noted. (8) The quartz wedge is removed, and insert a Senarmont compensator having one through-hole at the center then inserted in its place. The lower lens is covered with a yellow filter (MXA 20168, MF 45 IF 546). (9) The upper dial plate is turned until the field of view gets dark, and that scale value ($\theta$) is read. (10). The birefringence $\Delta n_Z$ is calculated according to the following equation:

$$\Delta n_A = [\{(\theta/180) \times \lambda\} + (\lambda \times \psi)]/\text{thickness of the film}$$

wherein $\lambda = 546$ nm.

The thus obtained $\Delta n_A$ is defined as follows based on the refractive indices of the film in the machine direction ($n_{MD}$) and in the transverse direction ($n_{TD}$.

$$\Delta n_A = |n_{MD} - n_{TD}|$$

$\Delta n_A$ is a measure indicative of the balance of molecular chain orientation between the machine direction and the transverse direction. As this value increases, it is assumed that the molecular chain orientation in either direction is more predominant. In the present invention, $\Delta n_A$ is in the range of from $0.6 \times 10^{-3}$ to $8 \times 10^{-3}$, and preferably from $0.8 \times 10^{-3}$ to $6 \times 10^{-3}$.

If $\Delta n_A$ exceeds $8 \times 10^{-3}$, the molecular chain orientation in one direction is too strong, resulting in difficulty of stretching in that direction. Additionally, the film easily undergoes necking under tension in the direction perpendicular to the direction of stronger orientation. Such a film is liable to wrinkle during stretch wrapping and will show a small strain recovery.

The smaller the $\Delta n_A$ value, the smaller the in-plane anisotropy of molecular orientation (it is difficult to obtain a film having $\Delta n_A$ of less than $0.6 \times 10^{-3}$ with the current commercially practical techniques of blown-film extrusion). Accordingly, in order to minimize the anisotropy of orientation, blown-film extrusion which is less causative of residual molten orientation is preferable to a tentering method, in which the film is stretched at a temperature lower than its melting point, or a stretching method, in which the degree of orientation is increased by making use of a difference in peripheral speed between rolls. The planar orientation anisotropy associated with the stretching between rolls may be minimized by making the stretch ratio and the temperature of stretching in one direction the same as those in the other direction. However, this results in production of a film which has a modulus of elasticity which is too high and is therefore liable to cause breakage of a tray during stretch wrapping.

Where blown-film extrusion involving molten orientation is adopted, the balance between the blow-up ratio and the take-off speed must be carefully considered. As the blow-up ratio increases, the take-off speed must be increased so that the orientation anisotropy between the machine direction and the transverse direction may be minimized. Accordingly, with the take-off speed ranging from 20 to 150 m/min, the blow-up ratio falls within a range of from 8 to 20, and preferably from 10 to 16.

With respect to condition (3), the heat shrinkage ratio ($S_{MD}/S_{TD}$) is also attributed to the balance of orientation stress between the machine direction and the transverse direction and is indicative of liability to form wrinkles upon stretch wrapping.

The shrinkage ratio should be in the range of from 0.65 to 1.5, preferably from 0.7 to 1.35, and is more preferably as close to 1 as possible. If it is less than 0.65 or more than 1.5, the film wrinkles upon being stretch wrapped. Besides wrinkling, the film will also have a small strain recovery so that the film covering a food, when pressed by a customer with a fingertip, does not recover from the strain and leaves wrinkles. If that particular item of wrapped food is not bought by that customer, another customer would likely care about the wrinkles caused by the residual strain of the film, and it is very likely that the wrapped food would remain unsold.

The heat shrinkage ratio is determined by soaking a 100 mm-square film specimen, which is marked with two lines intersecting at right angles and passing the center thereof, in a silicone oil bath at 140° C. for 3 minutes, preserving the specimen taken from the bath in a controlled environment kept at a temperature of 22° C. and a relative humidity of 57% for 2 hours, measuring the length of the crossing lines ($L_{MD}$, $L_{TD}$), and applying the measured values to the following equation:

$$S_{MD}/S_{TD} = (100 - L_{MD})/(100 - L_{TD})$$

Figure 5:
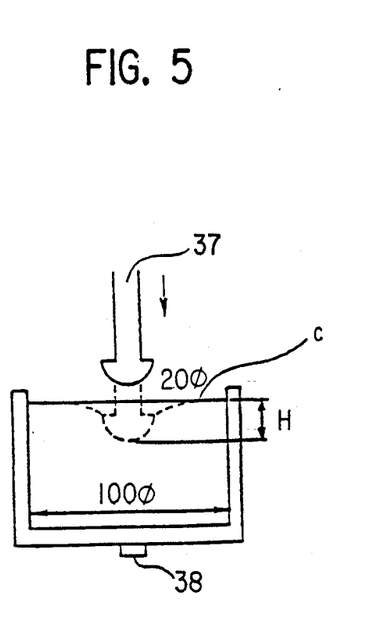
FIG. 5 is a plan view of a tester used for measurement of deformation recovery of wrapping film.

With respect to condition (4), the terminology "strain recovery" as used herein is a value obtained as follows. As shown in FIG. 5, circular film specimen c having a diameter of 100 mm is clamped, and piston rod 37 having a hemispherical indenter foot having a diameter of 20 mm is pressed down onto film c to cause deformation. The maximum strain H of film c which will disappear completely upon removal of the indenter is measured. The wrapping film of the present invention exhibits a strain recovery of at least 18 mm, preferably 20 mm or more, and more preferably from 23 to 35 mm. In FIG. 5, numeral 38 indicates a load cell.

With respect to condition (5), the wrapping film of the present invention is preferably as transparent as possible (haze: less than 3%) so that one may see the wrapped article through the film. However, for applications requiring no transparency, for example bag formation, transparency is of no importance. That is, the film may contain from 3 to 40% by weight of inorganic fine particles, such as carbon black, calcined clay, calcium carbonate, and talc, and may have a haze of 3% or more, and preferably from 40 to 100% (semitransparent to opaque).

With respect to condition (6), the film preferably has a tensile modulus (ISO R-1184) of from 600 to 1400 kg cm$^2$, more preferably 600 to 1200 kg/cm$^2$, in both machine and transverse directions so as not to cause tray breakage upon stretch wrapping. If the tensile modulus is less than 600 kg/cm$^2$, the film is too soft to provide a sufficiently tight fit to an article or tray. If it exceeds 1400 kg cm$^2$, the film is too hard and tends to cause deformation or, in some cases, breakage of a tray on wrapping.

In addition to the above-described conditions (1) to (6), the wrapping film of the present invention preferably has a ratio of stress at 50% elongation in the machine direction ($T_{MD}$) to stress at 50% elongation in the transverse direction ($T_{TD}$) ($T_{MD}/T_{TD}$; hereinafter referred to as stress ratio at 50% elongation), of from 0.50 to 2.50.

Having generally described this invention, a further understanding can be obtained by reference to certain specific examples which are provided herein for purposes of illustration only and are not intended to be limiting unless otherwise specified. All the parts and percents are by weight unless otherwise indicated.

EXAMPLE 1

Blown-film extrusion was conducted using blown-film extrusion machine 1 of FIG. 4 with its air ring 13 being displaced with cooling apparatus 13' of FIG. 1 according to the following specifications.

Diameter of ring dye C: 100 mm
Lip width: 1.0 mm

| Air cooling conditions: | | |
|---|---|---|
| | Air Flow Rate ($m^3$/min) | Air Flow Speed (m/sec) |
| Upstream Nozzle (24a) | 0.016 | 1 |
| Midstream nozzle (24b) | 3.2 | 25 |
| Downstream Nozzle (25) | 46.7 (open air) | 40 |

| Rectifying cylinders (angle of slope: 60°): | | |
|---|---|---|
| | Diameter (mm) | Height* (mm) |
| Innermost | 495 | 160 |
| Second | 580 | 185 |
| Third | 700 | 350 |
| Forth | 840 | 410 |
| Fifth | 1000 | 510 |
| Outermost | 1300 | 670 |

Note: *The height from the upper surface of die head C.

Linear low-density polyethylene "Ultzex 1020L" (a product of Mitsui Petrochemical Industries, Ltd.; MFR: 2.0 g/10 min; ethylene content; 84.9%; 4-methyl-1-pentene content: 15.1%) was kneaded in an extruder (diameter: 65 mm; L/D: 25) at 185° C. (resin A). Separately, a resin composition consisting of 98.5% of an ethylene-vinyl acetate copolymer resin (vinyl acetate content: 15%; MFR (190° C.): 2.0 g/10 min) and 1.5% of glycerol mono-oleate "Rikemal OL100" (a product of Riken Vitamin Oil Co., Ltd.) was kneaded in another extruder (diameter: 50 mm; L/D: 25) at 160° C. (resin B).

Two molten resins A and B were fed to a three-layered ring die with resin A as an intermediate layer and resin B as a surface layer on each side of the intermediate layer, co-extruded at a die temperature of 185° C., and inflated at a blow-up ratio of 12.0 and a take-off speed of 50 m/min to obtain a stretch-wrapping film having a total thickness of 11 μm (B/A/B=4 μm/3 μm/4 μm).

Physical properties of the resulting film were measured according to the aforementioned test methods and the following ones. The results obtained are shown in Table 1 below.

Strain Recovery (mm)

The tester of FIG. 5 was used. A piston rod of 20 mm in diameter was pressed onto the center of a film specimen at a speed of 500 mm/min and then withdrawn. The maximum strain (indentation height: mm) of the film caused by the piston rod which disappeared within 3 minutes from the withdrawal of the piston rod was taken as a strain recovery.

Tensile Strength at Break

Measured according to JIS Z-1702.

Tensile Elongation at Break

Measured according to JIS Z-1702.

Elmendorf Tensile Strength

Measured according to JIS Z-1702.

The resulting film was used for wrapping a tray of 210 mm long, 140 mm wide, 20 mm deep, and 2 mm thick made of foamed polystyrene, stretched polystyrene, or high-impact polystyrene with meat, fish, or vegetables on it by means of an automatic stretch wrapping machine "A-18X" (a product manufactured by Fuji Pack System Co., Ltd.). The appearance of the wrapped article was observed with the naked eye and evaluated in terms of breaking, deformation of the tray, and wrinkling. The results obtained are shown in Table 1.

EXAMPLES 2 AND 3 AND COMPARATIVE EXAMPLE 1

A blown film was produced in the same manner as in Example 1, except for changing the blow-up ratio to 8 (Example 2), 10 (Example 3), or 5 (Comparative Example 1) and adjusting the extrusion rates of resins A and B so as to obtain a total film thickness of 11 μm. Physical properties and wrapping suitability of the resulting film were evaluated in the same manner as in Example 1, and the results obtained are shown in Table 1.

EXAMPLES 4 AND 5

A blown film was produced in the same manner as in Example 1, except for using cooling apparatus 13 of FIG. 3 having the following specifications and increasing the blow-up ratio to 16 (Example 4) or 20 (Example 5)

Diameter of ring dye C: 100 mm
Lip width: 1.0 mm

| Air cooling conditions: | | |
|---|---|---|
| | Air Flow Rate ($m^3$/min) | Air Flow Speed (m/sec) |
| Upstream Nozzle (24a) | 0.016 | 1 |
| Midstream nozzle (24b) | 3.1 | 25 |
| Midstream nozzle (24c) | 13.4 | 31 |
| Downstream Nozzle (25) | 50.2 (open air) | 42 |

| Rectifying cylinders (angle of slope: 60°): | | |
|---|---|---|
| | Diameter (mm) | Height* (mm) |
| Innermost | 495 | 175 |
| Second | 580 | 215 |
| Third | 700 | 365 |
| Forth | 840 | 440 |
| Fifth | 1000 | 540 |

-continued

| | | |
|---|---|---|
| Outermost | 1300 | 715 |

Note: *The height from the upper surface of die head C.

Physical properties and wrapping suitability of the resulting film were evaluated in the same manner as in Example 1, and the results obtained are shown in Table 1.

TABLE 1

| | Compara. Example 1 | Example 2 | Example 3 | Example 1 | Example 4 | Example 5 |
|---|---|---|---|---|---|---|
| Blow-up ratio | 5 | 8 | 10 | 12 | 16 | 20 |
| Birefringence ($\times 10^{-3}$) | 2.5 | 0.9 | 2.4 | 4.2 | 6.3 | 8.0 |
| Haze (%) | 3.3 | 2.8 | 2.7 | 2.7 | 2.6 | 2.6 |
| Heat shrinkage ratio (MD/TD) | 1.55 | 1.20 | 1.29 | 1.15 | 1.10 | 1.05 |
| Percent heat shrinkage (MD/TD) (%) | 82/53 | 73/61 | 76/59 | 74/64 | 75/68 | 74/70 |
| Tensile modulus (MD/TD) (kg/cm$^2$) | 800/800 | 850/750 | 900/750 | 850/720 | 800/700 | 800/680 |
| Stress ratio at 50% elongation | 1.60 | 1.19 | 0.96 | 0.78 | 0.63 | 0.50 |
| Tear strength (MD/TD) (kg/cm) | 34/200 | 72/170 | 130/130 | 94/130 | 120/130 | 130/120 |
| Tensile strength at break (MD/TD) (kg/cm$^2$) | 330/330 | 340/310 | 330/360 | 310/360 | 330/370 | 290/370 |
| Tensile elongation at break (MD/TD) (%) | 330/360 | 440/370 | 430/370 | 470/330 | 490/310 | 500/300 |
| Breaking of film | not observed | not observed | not observed | not observed | not observed | not observed |
| Deformation of tray | not observed | not observed | not observed | not observed | not observed | not observed |
| Wrinkling of film | slightly observed | not observed | not observed | not observed | not observed | not observed |
| Strain recovery (mm) | 20 | 21 | 23 | 23 | 24 | 25 |

REFERENCE EXAMPLES 1 TO 4

Four commercially available olefin resin films for stretch wrapping were evaluated in the same manner as in Example 1. The results obtained are shown in Table 2 below.

COMPARATIVE EXAMPLE 2

Resin composition A for 1st and 5th layers comprising 98% of an ethylene-vinyl acetate copolymer (vinyl acetate content: 15%; MFR: 1 g/10 min) and 2.0% of glycerol mono-oleate was kneaded in an extruder (diameter: 50 mm; L/D=25) at 160° C. Resin composition B for 2nd and 4th layers comprising 65% of the above ethylene-vinyl acetate copolymer, 20% of an ethylene-propylene-ethylidenenorbornene copolymer elastomer (propylene content: 15 mol%; ethylidenenorbornene content: 2.8 mol%; MFR: 0.45 g/10 min; density: 0.88 g/cm$^3$), 10% of polypropylene (C$_2$ content: 4%; MFR: 7 g/10 min; density: 0.90 g/cm$^3$), and 5% of poly-1-butene (C$_2$ content: 4 mol%; MFR: 1.0 g/cm$^3$; density: 0.905 g/cm$^3$) was kneaded in a separate extruder (diameter: 65 mm; L/D=25) at 200° C. Resin composition C for a 3rd layer comprising 80% of the same polypropylene as for the 2nd layer and 20% of the same poly-1-butene as for the 2nd layer was kneaded in another separate extruder (diameter: 50 mm; L/D=25) at 200° C. The molten resin compositions A, B, and C were co-extruded through a five-layered ring die, and the extruded tube was quenched by means of a water cooling ring 6 cm distant from the lip end of the die from which water uniformly flowed out to obtain a tubular film having a diameter of 100 mm and a total thickness of 90 μm (A/B/C/B/A=10 μm/20 μm/30 μm/20 μm/10 μm).

The tubular film was passed through two pairs of delivery nip rolls and draw nip rolls and, meanwhile, heated to 40° C. with hot air. The film at that temperature was continuously inflated with air and stretched about 3.5 times in the machine direction and about 3.0 times in the transverse direction. The end portion of the film in the stretching zone was cooled with an air ring from which cold air of about 20° C. was blasted, and the stretched film was taken off with nip rolls and subjected to heat setting with hot air of 40° C. for several seconds. The flattened tube was separated into two by slitting both edges thereof to finally obtain a 10 μm thick wrapping film.

Physical properties and wrapping suitability of the resulting film were evaluated in the same manner as in Example 1, and the results obtained are shown in Table 2.

COMPARATIVE EXAMPLE 3

An ethylene-1-butene copolymer resin (C$_4$ content: 11.0%; MFR: 0.85 g/10 min) was kneaded in an extruder (diameter: 65 mm; L/D=25) at 220° C. (resin A). A resin composition comprising 98% of an ethylene-vinyl acetate copolymer resin (vinyl acetate content: 17%; MFR: 3.5 g/10 min) and 2.0% of glycerol mono-oleate was kneaded in a separate extruder (diameter: 50 mm; L/D=25) at 170° C. (resin B). The molten resins A and B were fed to a three-layered T-die with resin A as an intermediate layer and resin B as a surface layer, co-extruded at a die temperature of 220° C., and taken off at a speed of 60 m/min to obtain a three-layered laminate film having a total thickness of 16 μm (B/A/B=4 m/8 μm/4 μm).

Physical properties and wrapping suitability of the resulting film were evaluated in the same manner as in Example 1, and the results obtained are shown in Table 2.

TABLE 2

|  | Ref. Example 1 | Ref. Example 2 | Ref. Example 3 | Ref. Example 4 | Compara. Example 2 | Compara. Example 3 |
|---|---|---|---|---|---|---|
| Birefringence ($\times 10^{-3}$) | 10 | 10 | 1.6 | 14 | 10 | 1.7 |
| Heat shrinkage ratio (MD/TD) | 1.76 | 1.78 | 3.5 | 1.32 | 1.84 | 3.75 |
| Percent heat shrinkage (MD/TD) (%) | 81/46 | 72/41 | 74/21 | 89/67 | 73/42 | 75/20 |
| Tensile modulus (MD/TD) (kg/cm$^2$) | 900/1000 | 1680/1520 | 790/750 | 1630/1790 | 1670/1530 | 810/760 |
| Stress ratio at 50% elongation | 4.16 | 3.81 | 1.04 | 1.61 | 3.80 | 1.06 |
| Tear strength (MD/TD) (kg/cm) | 95/65 | 50/70 | 42/135 | 17/22 | 52/72 | 40/130 |
| Tensile strength at break (MD/TD) (kg/cm$^2$) | 330/310 | 590/590 | 270/240 | 860/700 | 595/585 | 260/250 |
| Tensile elongation at break (MD/TD) (%) | 200/430 | 150/350 | 430/540 | 200/350 | 150/360 | 420/550 |
| Breaking of film | not observed | not observed | observed | observed | not observed | observed |
| Deformation of tray | not observed | observed | observed | observed | observed | observed |
| Wrinkling of film | not observed | not observed | observed | observed | not observed | observed |
| Strain recovery (mm) | 15 | 20 | 10–13 | unmeasured | 19 | 11 |

EXAMPLES 6 TO 9 AND COMPARATIVE EXAMPLES 4 AND 5

A blown film was produced by using the same blown-film extrusion machine as used in Example 1.

Resin composition A comprising 70% of poly-1-butene "M 0200" (product of Shell Chemical Co., Ltd.; density: 0.915 g cm$^3$; MFR (190° C.): 1.8 g/10 min), 15% of a propylene-ethylene-1-butene random copolymer resin (ethylene content: 2.0%; 1-butene content: 13.0%; density: 0.896 g/cm$^3$; MFR (230° C.): 5.0 g/10 min), and 15% of an ethylene-vinyl acetate copolymer resin (vinyl acetate content: 15%; MFR (190° C.): 2.0 g/10 min) was kneaded in an extruder (diameter: 65 mm; L/D=25) at 185° C. Separately, resin composition B comprising 98.5% of an ethylene-vinyl acetate copolymer resin (vinyl acetate content: 15%; MFR (190° C.): 2.0 g/10 min) and 1.5% of glycerol mono-oleate "Rikemal OL100" (product of Riken Vitamin Oil Co., Ltd.) was kneaded in a different extruder (diameter: 50 mm; L/D=25) at 160° C. The molten resin compositions A and B were fed to a three-layered ring die with resin composition A as an intermediate layer and resin composition B as a surface layer, co-extruded at a die temperature of 185° C., and inflated at a varied blow-up ratio as shown in Table 3 below to obtain a three-layered laminate film having a total thickness of 11 μm (B/A/B=4 μm/3 μm/4 μm). Physical properties and wrapping suitability of the resulting film were evaluated in the same manner as in Example 1, and the results obtained are shown in Table 3 below.

TABLE 3

|  | Compara. Example 4 | Compara. Example 5 | Example 6 | Example 7 | Example 8 | Example 9 |
|---|---|---|---|---|---|---|
| Blow-up ratio | 5 | 8 | 10 | 12 | 16 | 20 |
| Birefringence ($\times 10^{-3}$) | 10 | 7.6 | 5.1 | 6.0 | 5.0 | 4.8 |
| Haze (%) | 2.5 | 2.4 | 2.4 | 1.3 | 1.3 | 1.2 |
| Heat shrinkage ratio (MD/TD) | 2.26 | 1.59 | 1.46 | 1.33 | 1.29 | 1.19 |
| Percent heat shrinkage (MD/TD) (%) | 86/38 | 72/45 | 83/57 | 81/61 | 84/65 | 84/71 |
| Tensile modulus (MD/TD) (kg/cm$^2$) | 1220/1100 | 1220/1110 | 1320/1210 | 1220/1120 | 1230/1130 | 1240/1120 |
| Stress ratio at 50% elongation | 4.39 | 3.65 | 2.32 | 1.98 | 1.86 | 1.70 |
| Tear strength (MD/TD) (kg/cm) | 160/26 | 82/23 | 56/17 | 75/20 | 73/23 | 72/24 |
| Tensile strength at break (MD/TD) (kg/cm$^2$) | 420/380 | 440/400 | 440/400 | 440/470 | 430/480 | 430/490 |
| Tensile elongation at break (MD/TD) (%) | 140/470 | 160/330 | 170/320 | 190/330 | 210/320 | 220/330 |
| Breaking of film | not observed | not observed | not observed | not observed | not observed | not observed |
| Deformation of tray | not observed | not observed | not observed | not observed | not observed | not observed |
| Wrinkling of film | seriously observed | slightly observed | not observed | not observed | not observed | not observed |
| Strain recovery (mm) | 15 | 16 | 18 | 20 | 21 | 23 |

EXAMPLES 10 TO 14 AND COMPARATIVE EXAMPLE 6

A blown film was produced by using the same blown-film extrusion machine as used in Example 1.

Resin composition A comprising 55% of poly-1-butene "M 0200" (product of Shell Chemical Co., Ltd.; density: 0.915 g/cm$^3$; MFR (190° C.): 1.8 g/10 min), 15% of a propylene-ethylene-1-butene random copolymer resin (ethylene content: 2.0%; 1-butene content:

13.0%; density: 0.896 g/cm$^3$; MFR (230° C.): 5.0 g/10 min), and 30% of an ethylene-1-butene copolymer elastomer (1-butene content: 20%; MFR (190° C.): 4.0 g/10 min; density: 0.88 g/cm$^3$) was kneaded in an extruder (diameter: 65mm; L/D=25) at 185° C. Separately, resin composition B comprising 98.5% of an ethylene-vinyl acetate copolymer resin (vinyl acetate content: 15%; MFR (190° C.): 2.0 g/10 min) and 1.5% of glycerol mono-oleate "Rikemal OL100" was kneaded in a different extruder (diameter: 50 mm; L/D=25) at 160° C. Both of the molten resin compositions A and B were fed to a three-layered ring die with resin composition A as an intermediate layer and resin composition B as a surface layer, co-extruded at a die temperature of 185° C., and inflated at a varied blow-up ratio as shown in Table 4 below to obtain a three-layered laminate film having a total thickness of 11 μm B/A/B=4 μm/3 μm/4 μm). Physical properties and wrapping suitability of the resulting film were evaluated in the same manner as in Example 1, and the results obtained are shown in Table 4.

μm/3 μm/4 μm). Physical properties and wrapping suitability of the resulting film were evaluated in the same manner as in Example 1. Wrapping suitability was additionally evaluated in terms of stretchability as observed with the naked eye on stretch wrapping by use of "A-18X". The results obtained are shown in Table 5 below.

EXAMPLE 16

A three-layered laminate film was produced in the same manner as in Example 15, except for using resin composition A comprising 80 parts of an ethylene-1-hexene copolymer (1-hexene content: 12%; density: 0.91 g/cm$^3$; MFR (190° C.): 2.0 g/10 min) and 20 parts of an ethylene-1-butene copolymer elastomer (1-butene content: 31%; density: 0.89 g/cm$^3$; g/10 min) as an intermediate layer. Physical properties and wrapping suitability of the resulting film were evaluated in the same manner as in Example 15, and the results obtained are shown in Table 5.

TABLE 4

|  | Compara. Example 6 | Example 10 | Example 11 | Example 12 | Example 13 | Example 14 |
|---|---|---|---|---|---|---|
| Blow-up ratio | 5 | 8 | 10 | 12 | 16 | 20 |
| Birefringence (×10$^{-3}$) | 3.9 | 2.0 | 2.7 | 1.9 | 1.6 | 1.5 |
| Haze (%) | 3.1 | 2.8 | 2.6 | 2.5 | 2.5 | 2.4 |
| Heat shrinkage ratio (MD/TD) | 1.56 | 1.14 | 1.36 | 1.38 | 1.36 | 1.31 |
| Percent heat shrinkage (MD/TD) (%) | 88/56 | 78/68 | 83/61 | 85/61 | 84/62 | 85/65 |
| Tensile modulus (MD/TD) (kg/cm$^2$) | 1050/1100 | 1050/1000 | 1000/1000 | 1000/900 | 950/900 | 900/850 |
| Stress ratio at 50% elongation | 2.29 | 1.67 | 1.88 | 1.75 | 1.68 | 1.65 |
| Tear strength (MD/TD) (kg/cm) | 55/26 | 32/17 | 48/48 | 52/42 | 46/43 | 48/45 |
| Tensile strength at break (MD/TD) (kg/cm$^2$) | 410/380 | 440/390 | 430/370 | 430/390 | 420/390 | 440/400 |
| Tensile elongation at break (MD/TD) (%) | 190/390 | 250/320 | 240/380 | 250/390 | 265/390 | 270/380 |
| Breaking of film | not observed | not observed | not observed | not observed | not observed | not observed |
| Deformation of tray | not observed | not observed | not observed | not observed | not observed | not observed |
| Wrinkling of film | slightly observed | not observed | not observed | not observed | not observed | not observed |
| Strain recovery (mm) | 16 | 18 | 19 | 20 | 22 | 23 |

EXAMPLE 15

Resin composition A comprising 45 parts of an ethylene-1-octene copolymer (ethylene content: 89%; 1-octene content: 11%; density: 0.92 g/cm$^3$; MRF: 1.2 g/10 min), 40 parts of an ethylene-1-octene elastomer (ethylene content: 78%; 1-octene content: 22%; density: 0.906 g cm$^3$; MFR (190° C.): 0.8 g/10 min), and 15 parts of an ethylene-vinyl acetate copolymer (ethylene content: 85%; vinyl acetate content: 15%; MFR: 2.0 g/10 min) was kneaded in an extruder (diameter: 65 mm; L/D=25) at 185° C. Separately, resin composition B comprising 98.5% of an ethylene-vinyl acetate copolymer resin (vinyl acetate content: 15%; MFR (190° C.): 2.0 g/10 min) and 1.5% of glycerol mono-oleate "Rikemal OL100" was kneaded in a different extruder (diameter: 50 mm; L/D=25) at 160° C. Both of the molten resin compositions A and B were fed to a three-layered ring die with resin composition A as an intermediate layer and resin composition B as a surface layer, co-extruded at a die temperature of 185° C., and inflated at a blow-up ratio of 12.0 to obtain a three-layered laminate film having a total thickness of 11 μm (B/A/B=4

EXAMPLE 17

A three-layered laminate film was produced in the same manner as in Example 15, except for using, as an intermediate layer, resin composition A comprising 80 parts of a propylene-ethylene-1-butene terpolymer (79:1:20 by weight; MFR (230° C.): 5 g/10 min) and 20 parts of the same ethylene-1-butene copolymer elastomer as used in Example 16. Physical properties and wrapping suitability of the resulting film were evaluated in the same manner as in Example 15, and the results obtained are shown in Table 5.

EXAMPLE 18

A three-layered laminate film was produced in the same manner as in Example 15, except for using resin composition A comprising 45 parts of the same ethylene-1-octene copolymer as used in Example 15 and 55 parts of an ethylene-1-butene copolymer elastomer (ethylene content: 70%; MFR (190° C.): 3.7 g/10 min; density: 0.88 g/cm$^3$) as an intermediate layer. Physical properties and wrapping suitability of the resulting film were evaluated in the same manner as in Example 15, and the results obtained are shown in Table 5.

EXAMPLE 19

A three-layered laminate film was produced in the same manner as in Example 15, except for using an ethylene-4-methyl-1-pentene copolymer (ethylene content: 88%; 4-methyl-1-pentene content: 12%; MFR: 2.0 g/10 min; density: 0.910 g/cm³) as an intermediate layer. Physical properties and wrapping suitability of the resulting film were evaluated in the same manner as in Example 15, and the results obtained are shown in Table 5.

EXAMPLE 20

A three-layered laminate film was produced in the same manner as in Example 15, except for changing the blow-up ratio to 16.0. Physical properties and wrapping suitability of the resulting film were evaluated in the same manner as in Example 15, and the results obtained are shown in Table 5.

COMPARATIVE EXAMPLE 7

A three-layered laminate film was produced in the same manner as in Example 15, except for changing the blow-up ratio to 5.0. Physical properties and wrapping suitability of the resulting film were evaluated in the same manner as in Example 15, and the results obtained are shown in Table 5.

(2) a birefringence $\Delta n_A$ ranging from $0.6 \times 10^{-3}$ to $8 \times 10^{-3}$, said birefringence defined by equation:

$$\Delta n_A = |n_{MD} - n_{TD}|$$

wherein $n_{MD}$ is a refractive index in the machine direction, and $n_{TD}$ is a refractive index in the transverse direction;

(3) a ratio $S_{MD}/S_{TD}$ ranging from 0.65 to 1.50, wherein $S_{MD}$ and $S_{TD}$ are each heat shrinkage in the machine direction and that in the transverse direction when the film is allowed to stand in a silicone oil bath at 140° C. for 3 minutes; and (4) a strain recovery of 18 mm or more, as determined by clamping a circular film specimen having a diameter of 100 mm, indenting at the center thereof with a hemispherical indenter 20 mm in diameter to cause deformation, and measuring the maximum strain which disappears completely upon removal of the indenter.

2. A wrapping film as claimed in claim 1, wherein film has a tensile modulus of from 600 to 1400 kg/cm² in both machine and transverse directions.

3. A wrapping film as claimed in claim 1, wherein said film has a ratio of stress at 50% elongation in the machine direction ($T_{MD}$) to stress at 50% elongation in the transverse direction ($T_{TD}$) of from 0.50 to 2.50.

4. A wrapping film as claimed in claim 1, wherein said film has a ratio of percent heat shrinkage in the machine

TABLE 5

| | Example 15 | Example 16 | Example 17 | Example 18 | Example 19 | Example 20 | Compara. Example 7 |
|---|---|---|---|---|---|---|---|
| Blow-up ratio | 12 | 12 | 12 | 12 | 12 | 16 | 5 |
| Birefringence (×10⁻³) | 4.0 | 4.5 | 4.6 | 5.2 | 3.1 | 5.9 | 3.0 |
| Heat shrinkage ratio (MD/TD) | 1.14 | 1.19 | 1.36 | 1.12 | 1.20 | 1.11 | 1.60 |
| Percent heat shrinkage (MD/TD) (%) | 79/69 | 76/64 | 83/61 | 73/65 | 79/66 | 78/70 | 80/50 |
| Tensile modulus (MD/TD) (kg/cm²) | 790/700 | 750/680 | 1350/1300 | 810/690 | 930/810 | 780/690 | 780/750 |
| Tensile strength at break (MD/TD) (kg/cm²) | 320/340 | 320/360 | 370/380 | 310/290 | 360/380 | 310/350 | 300/270 |
| Tensile elongation at break (MD/TD) (%) | 350/420 | 370/390 | 380/390 | 360/460 | 380/400 | 340/380 | 300/490 |
| Tear Strength (MD/TD) (kg/cm) | 85/120 | 70/140 | 105/250 | 55/65 | 90/170 | 105/95 | 45/170 |
| Stretchability | good | good | good | good | good | good | good |
| Breaking of film | not observed | not observed | not observed | not observed | not observed | not observed | not observed |
| Wrinkling of film | not observed | not observed | not observed | not observed | not observed | not observed | not observed |
| Strain recovery (mm) | 18 | 18 | 15 | 25 | 18 | 20 | 10 |

It is seen from the foregoing Examples that olefin resin films obtained by blown-film extrusion at a high blow-up ratio of from 8 to 20 and having a birefringence $\Delta n_A$ of from $0.6 \times 10^{-3}$ to $8 \times 10^{-3}$ and a heat shrinkage ratio at 140° C. of from 0.65 to 1.50 are excellent in deformation strain recovery and suitable as stretch wrapping film.

Obviously, numerous modifications and variations of the present invention are possible in light of the above teachings. It is therefore to be understood that within the scope of the appended claims, the invention may be practiced otherwise than as specifically described herein.

What is claimed is:

1. A wrapping film of a polyolefin-based resin, wherein the film has the following properties:

(1) a thickness ranging from 6 to 100 μm;

direction ($S_{MD}$) to percent heat shrinkage in the transverse direction ($S_{TD}$) of from 0.7 to 1.35.

5. A wrapping film as claimed in claim 1, wherein said film is a blown film obtained by inflating, at a blow-up ratio of from 9 to 20, a laminate tubular film having an intermediate layer comprising a linear low-density polyethylene-based resin having an MFR of from 0.1 to 5 g/10 min and a Q-value of from 1 to 6, wherein said intermediate layer has laminated on both sides thereof a surface Layer comprising a copolymer resin comprising from 60 to 95% by weight of ethylene-based structural units and from 5 to 40% by weight of structural units derived from a monomer selected from the group consisting of vinyl acetate, aliphatic unsaturated carboxylic acids, and aliphatic unsaturated carboxylic acid alkyl esters.

6. A wrapping film as claimed in claim 5, wherein said blown film has a total thickness of from 8 to 30 μm.

7. A wrapping film as claimed in claim 6, wherein said intermediate layer has a thickness of from 2 to 10 μm and each surface layer has a thickness of from 3 to 10 μm.

8. A wrapping resin film as claimed in claim 5, wherein said linear low-density polyethylene-based resin is a resin selected from the group consisting of ethylene-1-butene copolymers, ethylene-1-hexene copolymers, ethylene-1-butene-1-hexene copolymers, ethylene-4-methyl-1-pentene copolymers, ethylene-1-hexene copolymers, and ethylene-1-octene copolymers, wherein said resin has a density of from 0.89 to 0.93 g/cm$^3$.

9. A wrapping film as claimed in claim 1, wherein said film is a blown film obtained by inflating, at a blow-up ratio of from 9 to 20, a laminate tubular film having an intermediate layer comprising from 80 to 95% by weight of a linear low-density polyethylene having an MFR of from 0.1 to 5 g/10 min and a Q-value of from 1 to 6 and from 5 to 20% by weight of a copolymer resin comprising from 60 to 95% by weight of ethylene-based structural units and from 5 to 40% by weight of structural units derived from a monomer selected from the group consisting of vinyl acetate, aliphatic unsaturated carboxylic acids, and aliphatic unsaturated carboxylic acid alkyl esters, wherein said intermediate layer has laminated on both sides thereof a surface layer comprising a copolymer resin comprising from 60 to 95% by weight of ethylene-based structural units and from 5 to 40% by weight of structural units derived from a monomer selected from the group consisting of vinyl acetate, aliphatic unsaturated carboxylic acids, and aliphatic unsaturated carboxylic acid alkyl esters.

10. A wrapping film as claimed in claim 9, wherein said blown film has a total thickness of from 8 to 30 μm.

11. A wrapping film as claimed in claim 10, wherein said intermediate layer has a thickness of from 2 to 10 μm and each surface layer has a thickness of from 3 to 10 μm.

12. A wrapping film as claimed in claim 9, wherein said linear low-density polyethylene-based resin is a resin selected from the group consisting of ethylene-1-butene copolymers, ethylene-1-hexene copolymers, ethylene-1-butene-1-hexene copolymers, ethylene-4-methyl-1-pentene copolymers, ethylene-1-hexene copolymers, and ethylene-1-octene copolymers, wherein said resin has a density of from 0.89 to 0.92 g/cm$^3$.

13. A wrapping film as claimed in claim 1, wherein, said film is a blown film obtained by inflating, at a blow-up ratio of from 8 to 20, a laminate tubular film having an intermediate layer comprising from 10 to 90% by weight of a crystalline polyolefin-based resin selected from the group consisting of ethylene-based resins and propylene-based resins and from 10 to 90% by weight of an olefinic thermoplastic elastomer, wherein said intermediate layer has laminated on both sides thereof a surface layer comprising a copolymer resin comprising from 60 to 95% by weight of ethylene-based structural units and from 5 to 40% by weight of structural units derived from a monomer selected from the group consisting of vinyl acetate, aliphatic unsaturated carboxylic acids, and aliphatic unsaturated carboxylic acid alkyl esters.

14. A wrapping film as claimed in claim 13, wherein said blown film has a total thickness of from 8 to 30 μm.

15. A wrapping film as claimed in claim 14, wherein said intermediate layer has a thickness of from 2 to 10 μm and each surface layer has a thickness of from 3 to 10 μm.

16. A wrapping film as claimed in claim 5, wherein said surface layer or intermediate layer or both further contains at least one additive selected from the group consisting of lubricants, tackifiers, and nucleating agents.

17. A wrapping film as claimed in claim 9, wherein said surface layer or intermediate layer or both contains at least one additive selected from the group consisting of lubricants, tackifiers, and nucleating agents.

18. A wrapping film, as claimed in claim 13, wherein said surface layer or intermediate layer or both further contains at least one additive selected from the group consisting of lubricants, tackifiers, and nucleating agents.

19. A wrapping film as claimed in claim 16, wherein said at least one additive is present in a total amount of from 0.5 to 5% by weight.

20. A wrapping film as claimed in claim 17, wherein said at least one additive is present in a total amount of from 0.05 to 5% by weight.

21. A wrapping film as claimed in claim 18, wherein said at least one additive is present in a total amount of from 0.05 to 5% by weight.

22. A wrapping film as claimed in claim 16, wherein said lubricant is a compound selected from the group consisting of oleamide, stearamide, erucamide, glycerol monostearate, glycerol distearate, glycerol monooleate, glycerol dioleate, and a polyethylene glycol adduct of the glyceride.

23. A wrapping film as claimed in claim 17, wherein said lubricant is a compound selected from the group consisting of oleamide, stearamide, erucamide, glycerol monostearate, glycerol distearate, glycerol monooleate, glycerol dioleate, and a polyethylene glycol adduct of the glyceride.

24. A wrapping film as claimed in claim 18, wherein said lubricant is a compound selected from the group consisting of oleamide, stearamide, erucamide, glycerol monostearate, glycerol distearate, glycerol monooleate, glycerol dioleate, and a polyethylene glycol adduct of the glyceride.

25. A wrapping film as claimed in claim 16, wherein said tackifier is a compound selected from the group consisting of castor oil derivatives, low-molecular viscous polybutylenes, and sorbitan higher fatty acid esters containing from 12 to 22 carbon atoms in the higher fatty acid moiety.

26. A wrapping film as claimed in claim 17, wherein said tackifier is a compound selected from the group consisting of castor oil derivatives, low-molecular viscous polybutylenes, and sorbitan higher fatty acid esters containing from 12 to 22 carbon atoms in the higher fatty acid moiety.

27. A wrapping film as claimed in claim 18, wherein said tackifier is a compound selected from the group consisting of castor oil derivatives, low-molecular viscous polybutylenes, and sorbitan higher fatty acid esters containing from 12 to 22 carbon atoms in the higher fatty acid moiety.

28. A wrapping film as claimed in claim 16, wherein said nucleating agent is talc or silica powder.

29. A wrapping film as claimed in claim 17, wherein said nucleating agent is talc or silica powder.

30. A wrapping film as claimed in claim 18, wherein said nucleating agent is talc or silica powder.

* * * * *